United States Patent
Mizukawa

[11] Patent Number: 6,158,264
[45] Date of Patent: Dec. 12, 2000

[54] METHOD OF WORKING A BAND BLADE

[76] Inventor: Suehiro Mizukawa, 4-25, Torikainishi 5-chome, Settsu-shi, Osaka-fu, Japan

[21] Appl. No.: 09/317,939

[22] Filed: May 25, 1999

[30] Foreign Application Priority Data

Jun. 3, 1998 [JP] Japan .................................. 10-154528

[51] Int. Cl.[7] .................................................. B21D 28/00
[52] U.S. Cl. .............................................. 72/294; 72/307
[58] Field of Search .............................. 72/294, 307, 306, 72/131, 129, 339

[56] References Cited

U.S. PATENT DOCUMENTS

| | | | |
|---|---|---|---|
| 1,807,847 | 6/1931 | Kellogg | 72/131 |
| 5,456,099 | 10/1995 | Lipari | 72/131 |
| 5,461,893 | 10/1995 | Tyler | 72/294 |
| 5,463,890 | 11/1995 | Tachibana | 72/294 |
| 5,771,725 | 6/1998 | Mizukawa | 72/294 |

FOREIGN PATENT DOCUMENTS 209876 1/1987 European Pat. Off. ............. 72/307

*Primary Examiner*—Daniel C. Crane
*Attorney, Agent, or Firm*—Jones, Tullar & Cooper, P.C.

[57] ABSTRACT

The present invention relates to a method of working a band blade that is a so-called Thomson blade. In the invention, a band blade 1 is bent into a predetermined shape by a bending mechanism 7, the bent band blade is then forward fed, and a rear portion of a bent region Z of the band blade 1 is cut away by using a front band-blade cutting tool 2 which is placed in front of the bending mechanism 7. In the invention, in advance of bending of the band blade 1, a step of cutting the front end of the band blade 1 by using a rear band-blade cutting tool 2 which is placed in rear of the front band-blade cutting tool 2 may be conducted. After the front end of the band blade 1 is cut by using the rear band-blade cutting tool 2, the band blade 1 is forward fed, a bridge 14 is formed in the band blade 1 by using a bridge punching mechanism 8, and the band blade 1 is then forward fed to be bent into a predetermined shape by the bending mechanism 7. According to the invention, without previously cutting the band blade 1 so as to have a predetermined short length, the band blade 1 can be bent while maintaining its long length.

10 Claims, 19 Drawing Sheets

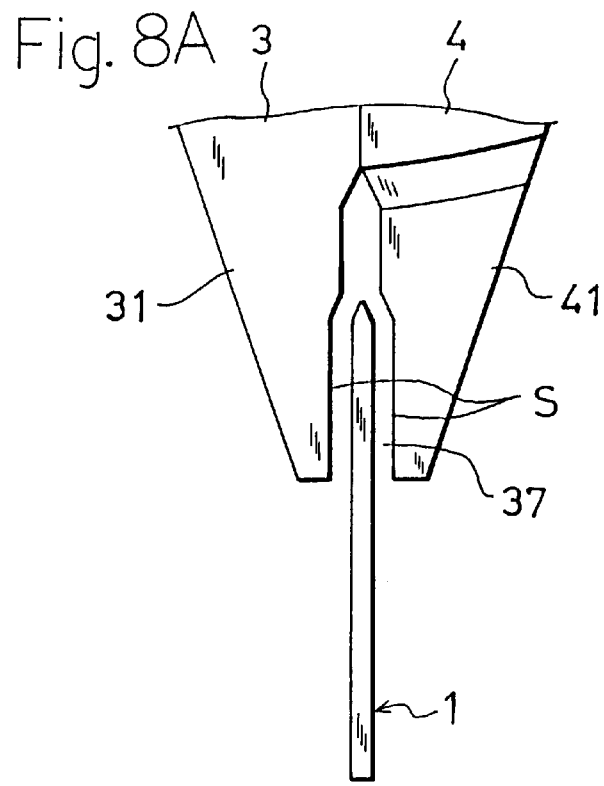
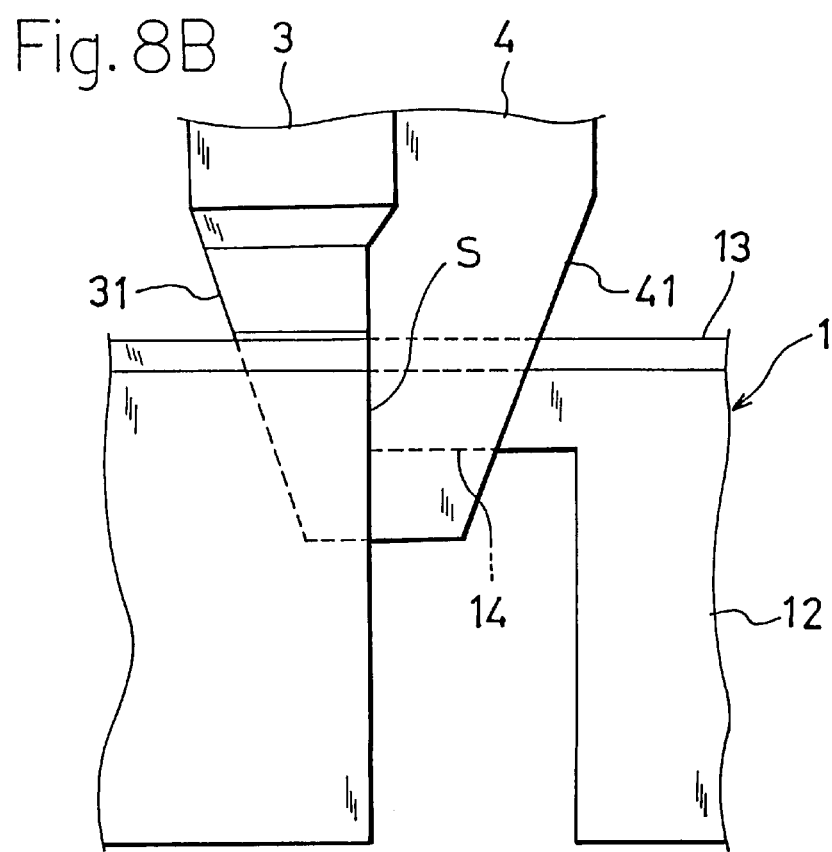

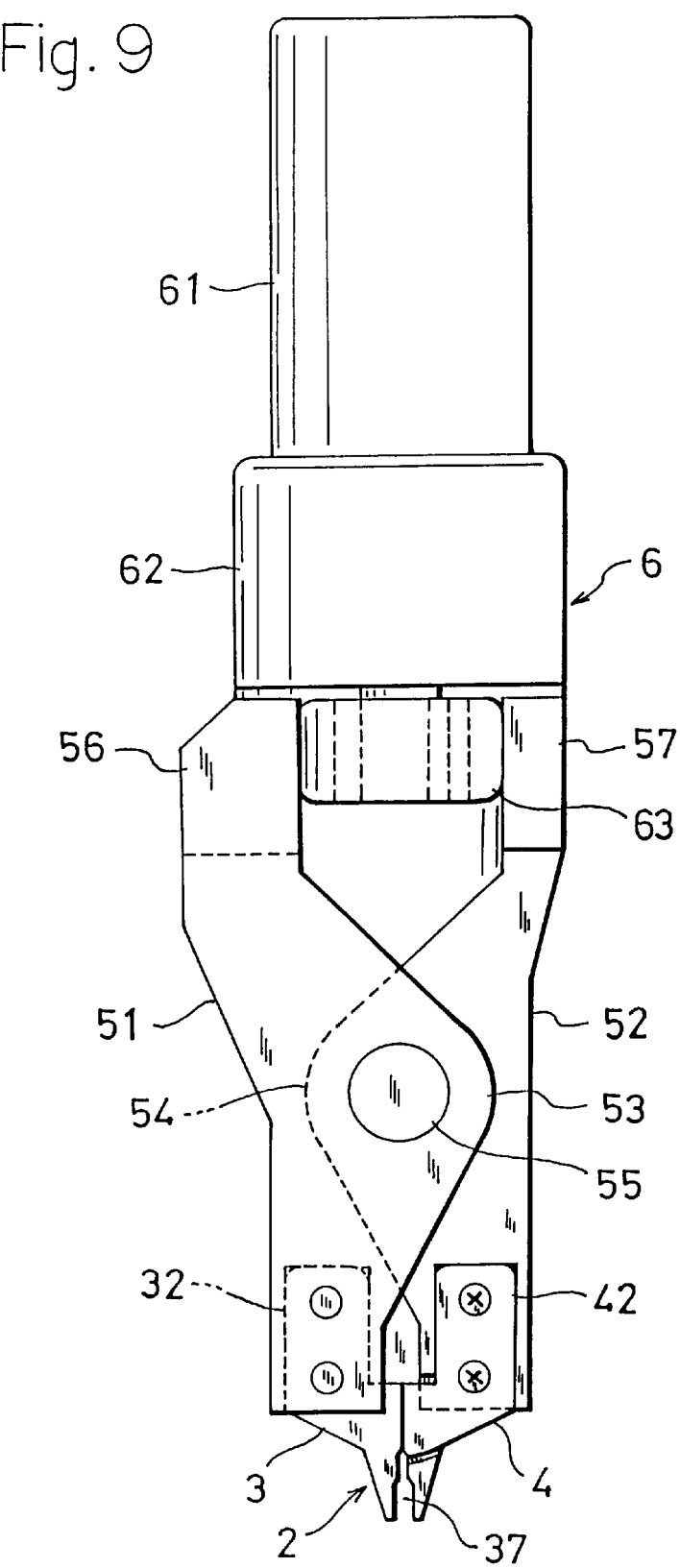

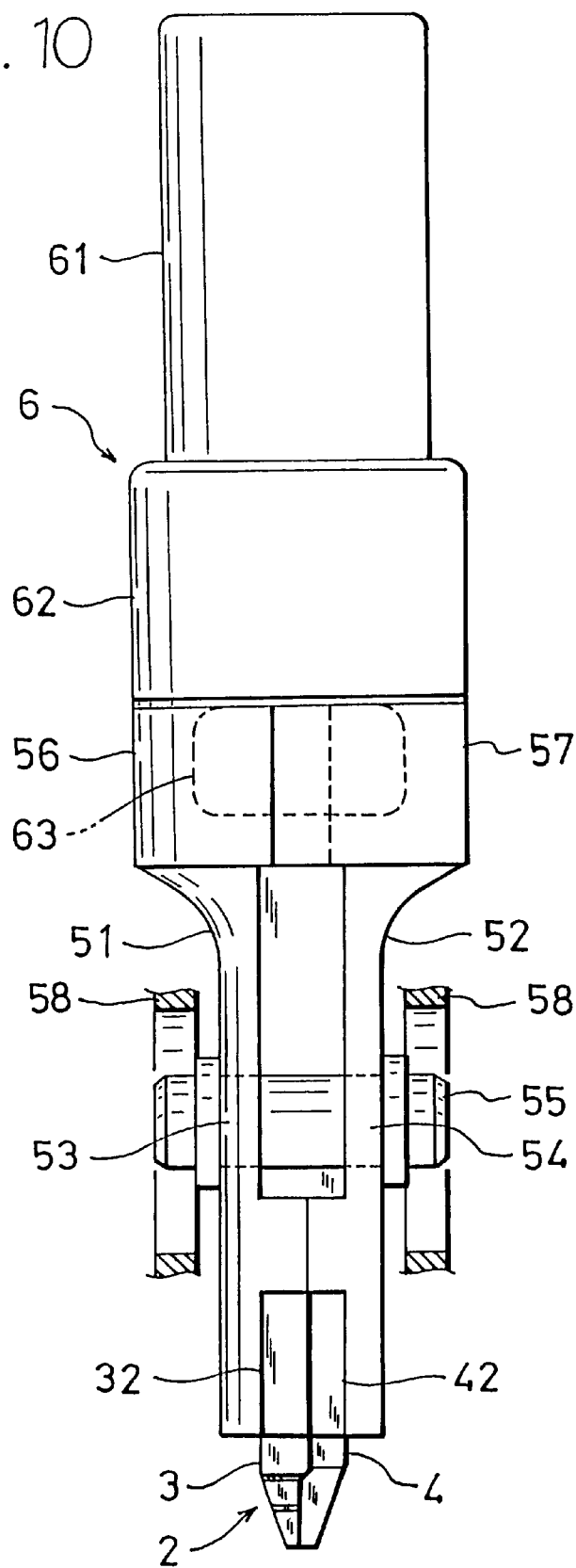

METHOD OF WORKING A BAND BLADE

BACKGROUND OF THE INVENTION

1. Field of the Invention

The present invention relates to a method of working a band blade that is a so-called Thomson blade.

2. Description of the Prior Art

As shown in FIGS. 18A and 19, a band blade 1 which is a so-called Thomson blade has an sharp blade portion 13 along one edge in the width direction of a strip-like ridge portion 12. The band blade 1 is subjected to necessary workings and then used in, for example, the formation of breaks or a fold in a paper piece, a paper sheet, a wood piece, or the like. In addition to working for folding the band blade 1 into a predetermined shape, workings which may be applied to the band blade 1 include: working of punching given portions of the ridge portion 12 of the band blade 1 into a rectangular shape to form bridges 14 in the ridge portion 12 as shown in FIG. 18B; and that of cutting away the bridges 14 as shown in FIG. 18C. The cutting of the bridges 14 may be conducted by, for example, a so-called miter cutting in which, as shown in the XXA portion in FIG. 18C and in FIG. 20A, the blade portion 13 is obliquely crossly cut so that one cut end 13a has the same inclination angle θ2 as the inclination angle θ1 (see FIG. 19) of the side face of the blade portion 13, or so-called straight cutting in which, as shown in the XXB portion in FIG. 18C and in FIG. 20B, the blade portion 13 is cut perpendicular to the blade edge so that both cut ends 13c have a straight end face. As shown in FIG. 21, for example, the band blade 1 which has undergone miter cutting so that the blade portion 13 protrudes from the end of the band blade 1 is placed so that the cut end 13a of the blade portion 13 is tightly butted against a side face of a blade portion 13' of another band blade 1' serving as a counter member.

Conventionally, when an end of a band blade on which miter cutting or straight cutting is applied and which is bent into a predetermined shape is to be produced, a long band blade is cut to form a band blade of a constant length, and bending and miter cutting or straight cutting are then applied to the band blade of a constant length. It is approximately considered that this is conducted because of the following reason. In a band-blade working apparatus of the prior art, a bending mechanism is placed in the front part of the feeding path of a band blade, and a band-blade cutting tool and a bridge punching mechanism are placed in the rear of the bending mechanism. In the case where a long band blade is used as it is, after the band blade is once bent by using the bending mechanism, therefore, the band blade cannot be retracted to the rear of the bending mechanism to be cut.

SUMMARY OF THE INVENTION

The present invention was achieved in view of the above-discussed circumstances and the like.

It is an object of the present invention to provide a method of working a band blade in which, even after a long band blade is bent without previously cutting the band blade so as to have a predetermined short length, or while maintaining its long length, the band blade can be cut.

It is another object of the present invention to provide a method of working a band blade in which miter cutting or straight cutting can be applied to both the front and rear ends of a band blade as required.

It is a further object of the present invention to provide a method of working a band blade in which, a band blade in which the front and rear ends are miter-cut or straight-cut and which is bent into a predetermined shape is to be produced, the amount of a feed required of the band blade is reduced to a minimum level so that production efficiency is enhanced.

It is a still further object of the present invention to provide a method of working a band blade in which, when the front and rear ends of a band blade are to be cut by using a band-blade cutting tool, cutting can be easily conducted.

In the present invention, a band blade is cut after the band blade is bent.

The method of the present invention comprises the steps of: bending a band blade into a predetermined shape by using a bending mechanism; forward feeding of the bent band blade; and cutting away a rear portion of a bent region of the band blade which is forward fed, by using a front band-blade cutting tool which is placed in front of the bending mechanism.

In the method of working a band blade, depending on the front band-blade cutting tool, there are some cases such as that where the blade portion of the band blade is cut so as to protrude rearwardly, and that where the blade portion of the band blade is straight cut in the width direction. The front band-blade cutting tool may comprise both a miter-cutting portion which conducts cutting so that the blade portion of the band blade to be cut protrudes rearwardly, and a straight-cutting portion which straight cuts the blade portion of the band blade to be cut, in the width direction, and may selectively use the miter-cutting portion and the straight-cutting portion.

According to the invention, a band blade which is bent into a predetermined shape can be cut by using the front band-blade cutting tool which is placed in front of the bending mechanism, and without retracting the band blade to the rear side of the bending mechanism. Therefore, it is possible to eliminate the labor of previously cutting the band blade into a predetermined short length before working is conducted on the band blade. When the front band-blade cutting tool has a straight-cutting portion, the rear end of the band blade can be straight-cut, or, when the tool has a miter-cutting portion, the rear end of the band blade can be miter cut. When the tool has both the cutting portions and is configured so as to selectively use one of the portions, straight cutting or miter cutting can be conducted as required.

In the present invention, in advance of the step of bending the band blade into a predetermined shape, a step of cutting a front end of the band blade by using a rear band-blade cutting tool which is placed in the rear of the front band-blade cutting tool may be conducted. For example, the rear band-blade cutting tool cuts the front end of the blade portion so that the blade portion protrudes forwardly, or straight cuts the front end of the band blade in the width direction of the blade portion. The rear band-blade cutting tool may comprise both a miter-cutting portion which cuts the front end of the band blade so that the blade portion protrudes forwardly, and a straight-cutting portion which straight cuts the front end of the band blade in the width direction of the blade portion, and may selectively use the miter-cutting portion and the straight-cutting portion.

In the present invention, a bridge may be previously formed by applying punching on a part of the band blade in a place of the band blade which is to be cut by using the front band-blade cutting tool; a bridge may be previously formed by applying punching on a part of the band blade in a place of the band blade which is to be cut by using the rear band-blade cutting tool; or a bridge may be previously formed by applying punching on a part of the band blade in a place of the band blade which is to be cut by using the front band-blade cutting tool or the rear band-blade cutting tool. Preferably, the step of forming a bridge by applying punching on a part of the band blade is performed by using a bridge punching mechanism which is placed in the rear of the rear band-blade cutting tool.

In the present invention, after the front end of the band blade is cut by using the rear band-blade cutting tool, the band blade fed forwardly, a bridge is formed in the band blade by using a bridge punching mechanism, and the band blade is then fed forwardly to be bent into a predetermined shape by the bending mechanism. According to this method, while the fed amount of the band blade is reduced to a minimum level, the front and rear ends of the band blade can be miter-cut or straight-cut, and the band blade can bent into a predetermined shape.

As described above, according to the present invention, even after a long band blade is bent without previously cutting the band blade so as to have a predetermined short length, or while maintaining its long length, the band blade can be cut. The shape of an end of the band blade may be formed by either miter cutting or straight cutting. According to the present invention, when a band blade in which the front and rear ends are miter-cut or straight-cut and which is bent into a predetermined shape is to be produced, the feed amount of the band blade required can be reduced to a minimum level so that production efficiency is enhanced. According to the present invention, a method of working a band blade can be provided in which, when the front and rear ends of a band blade are to be cut by using a band-blade cutting tool, cutting can be easily conducted.

Features of the present invention and functions of the present invention will be clarified by a discussion of the embodiments which will be described below.

BRIEF DESCRIPTION OF THE DRAWINGS

FIG. 8A is a diagram of straight cutting as seen from the front side;

FIG. 8B is a diagram of straight cutting as seen from the lateral side;

FIG. 9 is a front view of a band-blade cutting tool unit;

FIG. 10 is a side view of the band-blade cutting tool unit;

DETAILED DESCRIPTION OF THE PREFERRED EMBODIMENT

Figure 1:
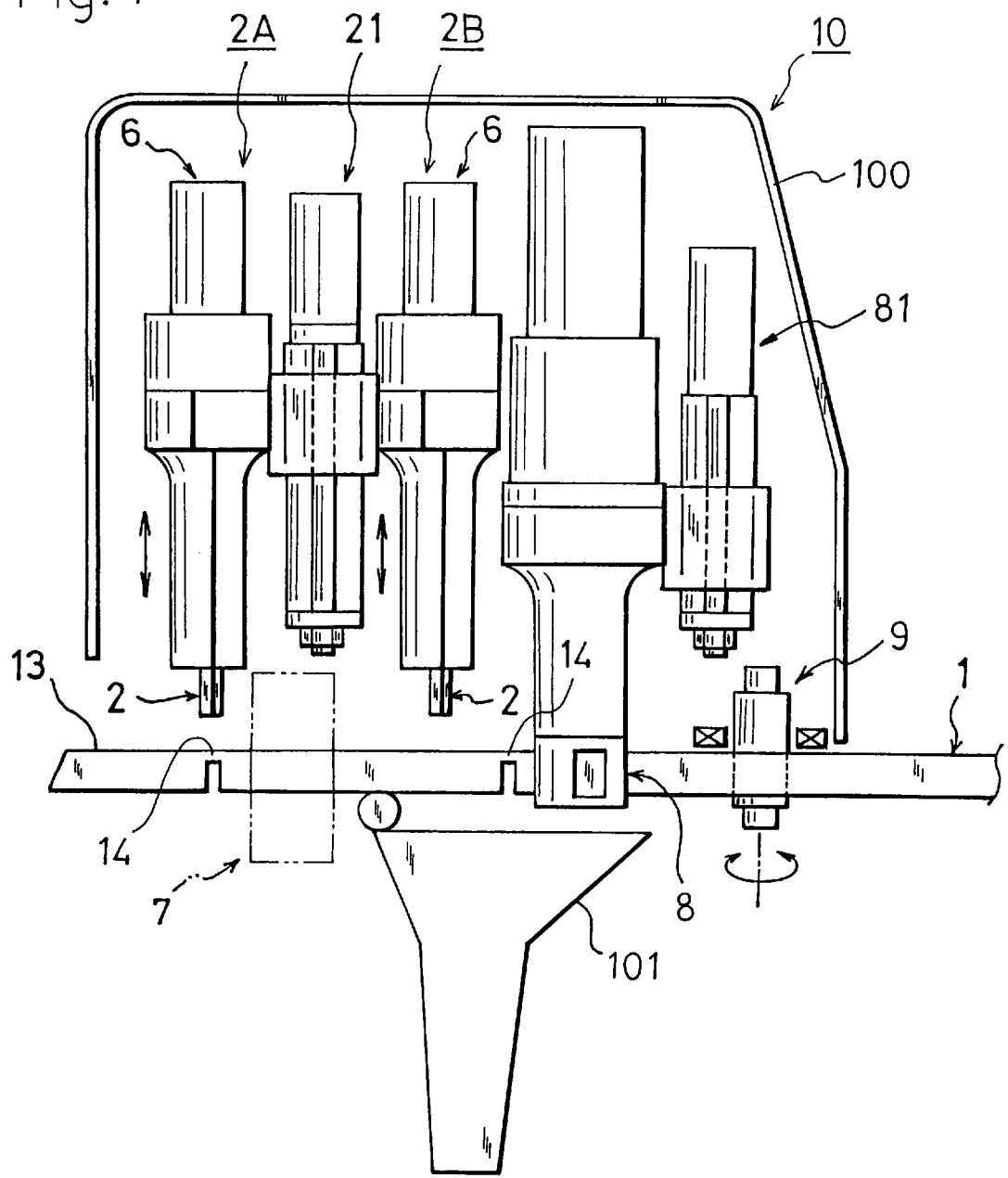
FIG. 1 a diagram showing the configuration of a band-blade working apparatus.

Prior to description of the method of working a band blade according to the invention, the configuration of a band-blade working apparatus 10 which can be used in the method will be described with reference to FIG. 1. The band-blade working apparatus 10 comprises: two band-blade cutting tool units 2A and 2B; a bending mechanism 7; a bridge punching mechanism 8; and a reciprocal driving mechanism 9 which extracts and retracts the band blade 1 in the anteroposterior direction. These components are housed in a case 100. The apparatus further comprises a chute 101 which recovers cut pieces and which is disposed below the movement path of the band blade 1. The chute 101 is disposed below the band-blade cutting tool unit 2B which is placed in the rear side and the bridge punching mechanism 8.

Figure 2:
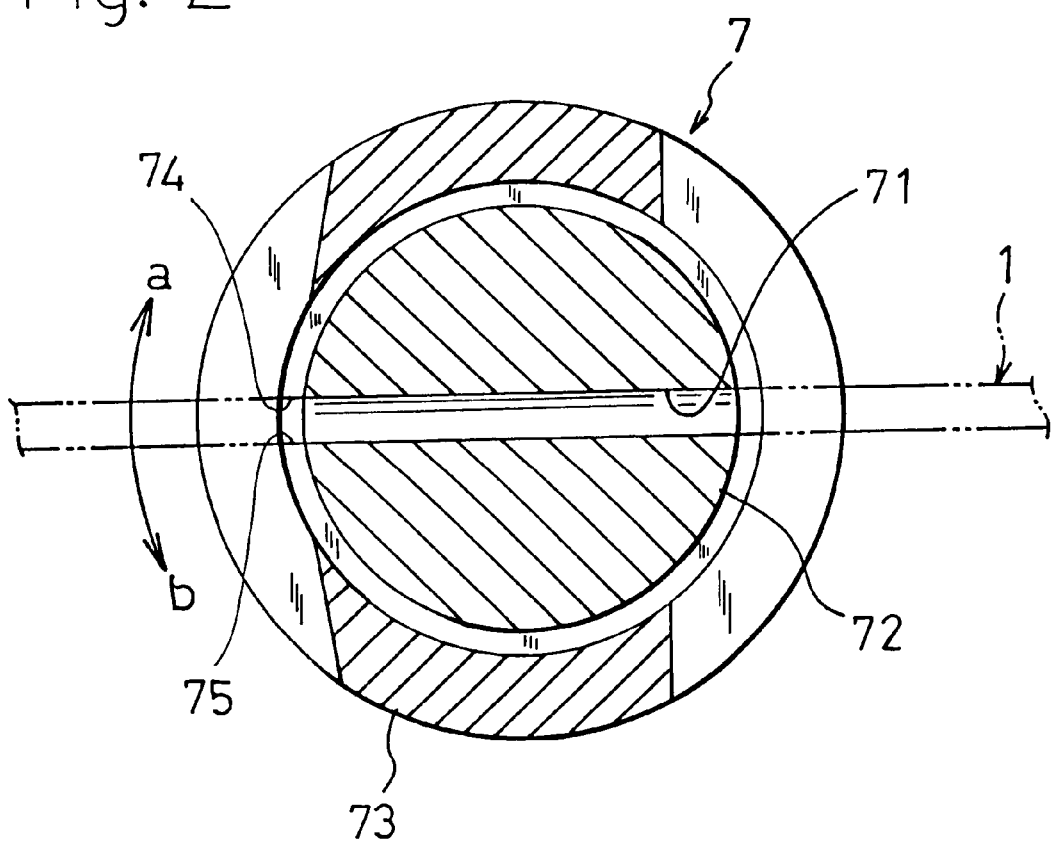
FIG. 2 is a cross sectional plan view of a bending mechanism.

The bending mechanism 7 has a function of bending the band blade 1 into a given shape. As shown in FIG. 2, for example, the bending mechanism 7 is configured by a die 72 having a slit-like opening 71, and a movable member 73 which laterally presses the band blade 1 passed through the opening 71 of the die 72 to bend the band blade. In the figure, the arrows a and b indicate the movement directions of the movable member 73. In the bending mechanism 7, the movable member 73 is rotated in the direction of the arrow a or b with respect to the band blade 1 protruded from the opening 71 of the die 72. The band blade 1 which is laterally pressed by the movable member 73 is butted against one of opening edges 74 and 75 of the die 72, to be bent. The bending angle of the band blade 1 depends on the rotation amount of the movable member 73, and the bent place of the band blade 1 is determined by the feeding amount of the band blade 1 from the opening 71.

Referring to FIG. 1, the reciprocal driving mechanism 9 has a function of forwarding (advancing) or retreating (retracting) the band blade 1 by a given distance along the movement path. For example, the reciprocal driving mechanism 9 may be configured by a pair of rollers which are rotated forward and rearward by a predetermined amount by a motor such as a pulse motor which is not shown. In this case, the band blade 1 which is pressingly held between the rollers is reciprocally moved in the longitudinal direction by a distance corresponding to the rotation amount of the rollers.

Each of the band-blade cutting tool units 2A and 3B comprises a cutting tool driving mechanism 6, and a band-blade cutting tool 2 which is coupled to the cutting tool driving mechanism 6. The band-blade cutting tool units 2A and 2B are distributedly placed in front and rear sides of the bending mechanism 7. Therefore, the band-blade cutting tool 2 of the band-blade cutting tool unit 2A in front of the bending mechanism 7 is called the front band-blade cutting tool, and the band-blade cutting tool 2 of the band-blade cutting tool unit 2B in rear of the bending mechanism 7 is called the rear band-blade cutting tool.

Figure 18A:
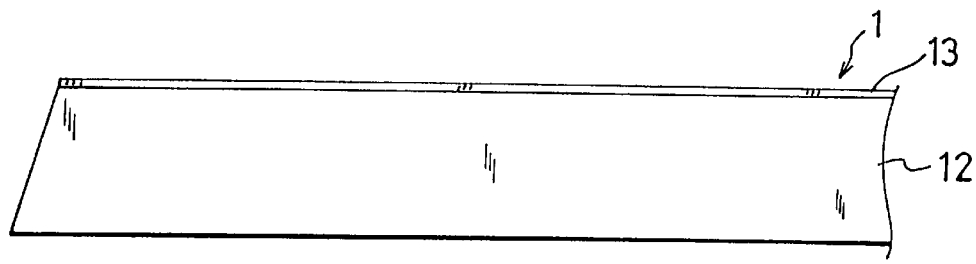
FIG. 18A is a partial side view of a band blade.

Each of the front and rear band-blade cutting tools 2 comprises both miter-cut portions and straight-cut portions. This will be described later. In the front and rear band-blade cutting tools 2, the cut parts of blade portion 13 which are cut by the miter-cutting portions of the tools are oppositely inclined. The front and rear band-blade cutting tool units 2A and 2B are attached to an elevation driving mechanism 21 which raises and lowers the units, so that, when the units are to be used, the units are lowered with respect to the movement path of the band blade 1 to cut the bridge 14 of the band blade 1 (see FIG. 18C), and, when the units are not to be used, the units are retracted to a space above the movement path of the band blade 1. In this case, as required, the elevation driving mechanism 21 functions so as to selectively place the front and rear band-blade cutting tool units 2 in a position suitable for conducting miter cutting which has been described with reference to FIG. 5, or that suitable for straight cutting which has been described with reference to FIG. 6. In this way, the miter-cutting portions and the straight-cutting portions are selectively used.

Figure 18B:
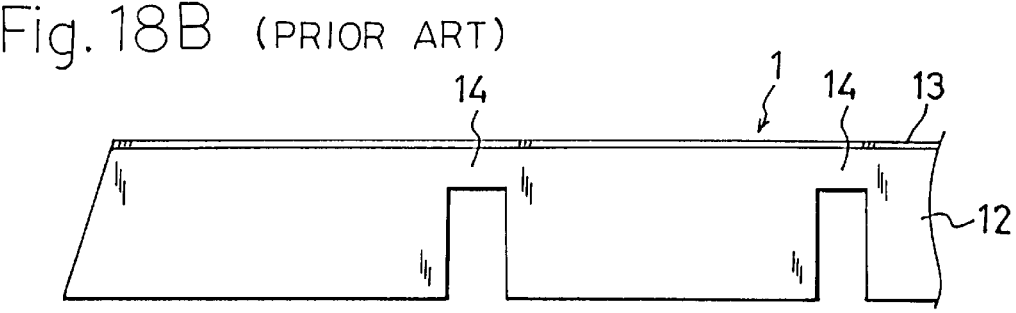
FIG. 18B is a partial side view of the band blade in which bridges are formed.
Figure 18C:
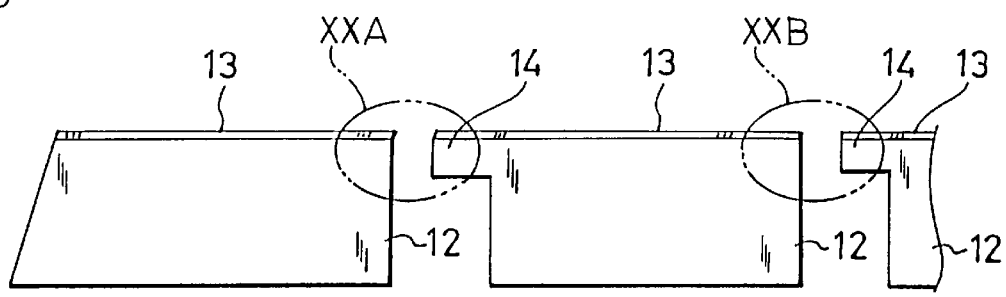
FIG. 18C is a partial side view of the band blade in which the bridges are cut.

The bridge punching mechanism 8 is placed in rear of the rear band-blade cutting tool 2. The bridge punching mechanism 8 has a function of applying punching to the ridge portion 12 of the band blade 1 which has been described with reference to FIG. 18A, to form the bridge 14 in the ridge portion 12 as shown in FIG. 18B. As the bridge punching mechanism 8, for example, a mechanism may be preferably used which comprises a female mold that is to be placed on one side of the band blade 1, and a male mold that is to be placed on the other side, and in which the male mold is pushed so as to conduct the punching step. The bridge punching mechanism 8 is attached to an elevation driving mechanism 81 which raises and lowers the bridge punching mechanism, so that, when the mechanism is to be used, the mechanism is lowered to apply punching to the band blade 1, and, the mechanism is not to be used, the mechanism is retracted to an upper space.

Each of the elevation driving mechanisms 21 and 81 may be configured by a screw shaft which is rotated forward and rearward at a fixed position, and a nut member which is screwed with the screw shaft. In this case, the band-blade cutting tools 2 or the bridge punching mechanism 8 is attached to the nut member. In the band-blade working apparatus 10 of FIG. 1, all control items such as the feed timing, direction, and amount of the band blade 1, the raising and lowering timings and the operation timing of the bridge punching mechanism 8, the raising and lowering timings and the operation timing of the band-blade cutting tool units 2A and 2B, and the operation timing of the bending mechanism 7 can be correctly controlled by a computer. When such a computer control is employed, working which is required to be applied on the band blade 1 used as a Thomson blade is automatically conducted.

Figure 3:
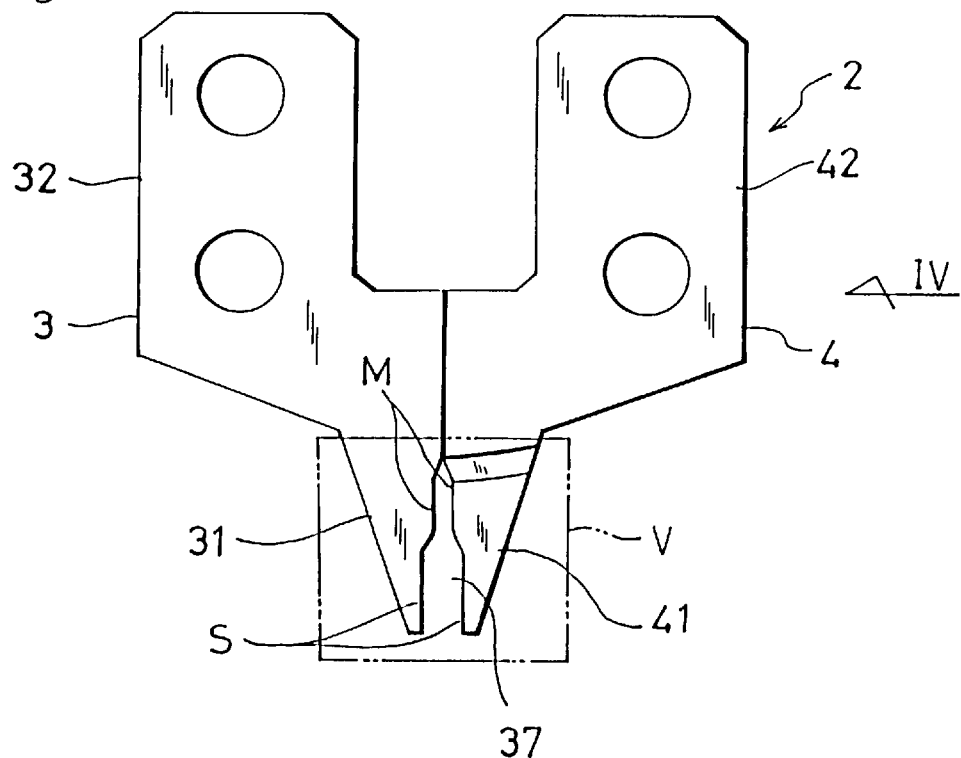
FIG. 3 is a front view of a band-blade cutting tool.
Figure 4:
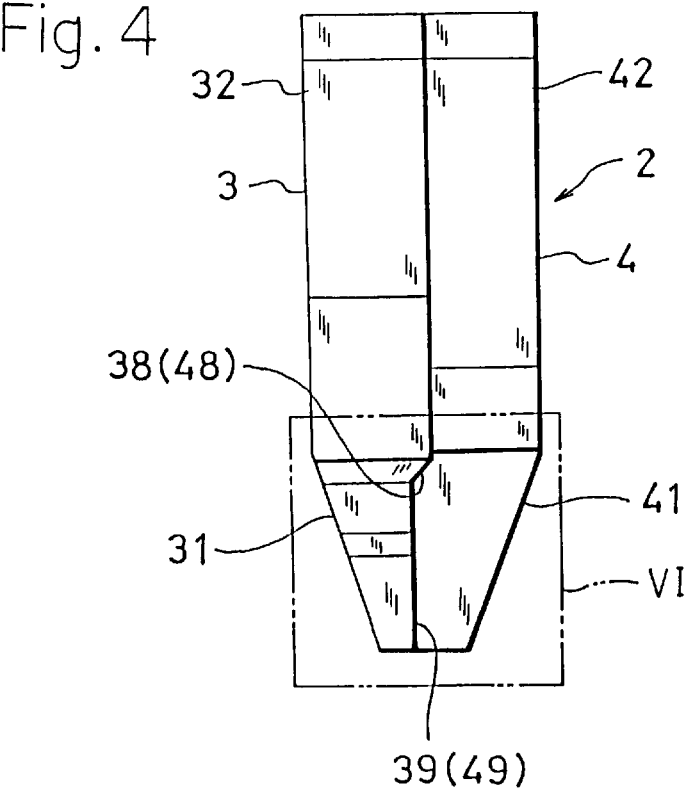
FIG. 4 is a view looking in the direction of the arrow IV of FIG. 3.
Figure 5:
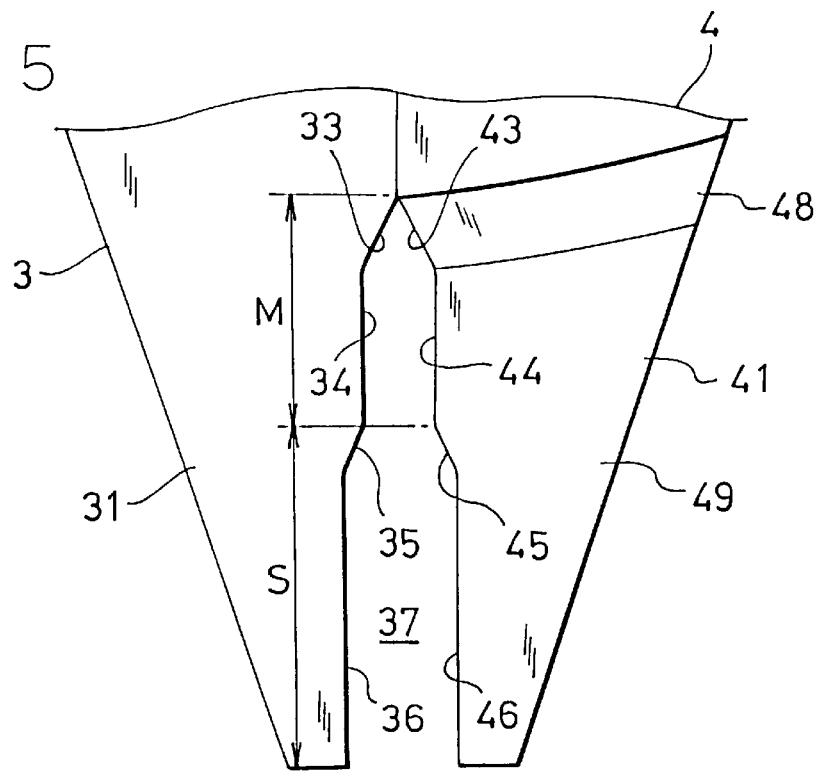
FIG. 5 is an enlarged view of the V portion of FIG. 3.
Figure 6:
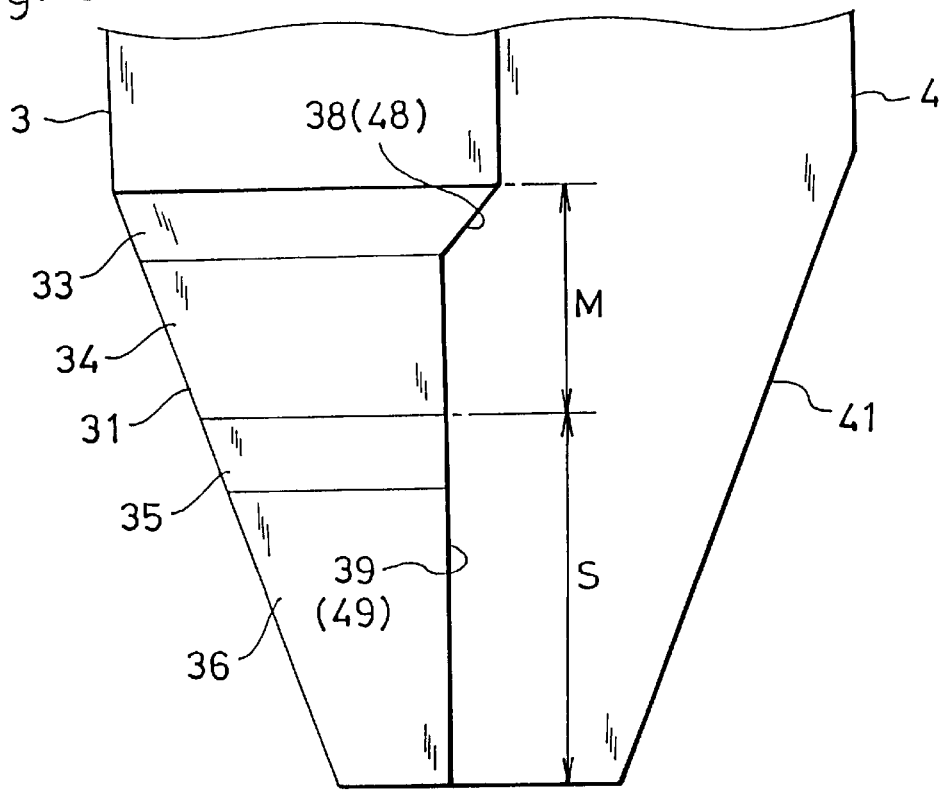
FIG. 6 is an enlarged view of the VI portion of FIG. 4.
Figure 20A:
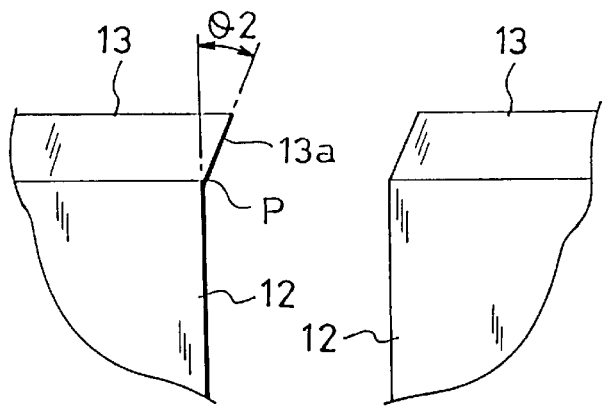
FIG. 20A is an enlarged view of the XXA portion of FIG. 18C.
Figure 20B:
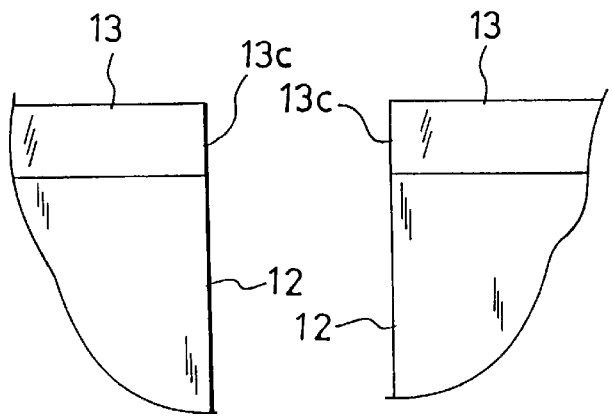
FIG. 20B is an enlarged view of the XXB portion of FIG. 18C.
Figure 21:
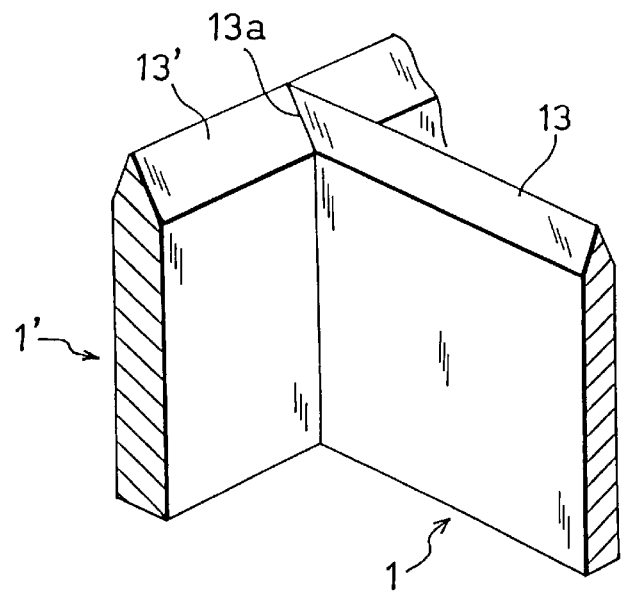
FIG. 21 is a partial perspective view showing an example of the use state of a band blade.

FIGS. 3 to 6 show the band-blade cutting tool 2. The band-blade cutting tool 2 has a pair of left and right edged members 3 and 4 which are opened and closed. Cutting blades 31 and 41, and mounting pieces 32 and 42 are disposed on the edged members 3 and 4, respectively. As shown in FIGS. 5 and 6, each of the cutting blades 31 and 41 is partitioned into two sections in the longitudinal direction (the vertical direction in the figure). The upper section is formed as a miter-cutting portion M, and the lower section as a straight-cut portion S. The miter-cutting portions M are portions which, as shown in FIG. 20A, obliquely crossly cut the blade portion 13 of the band blade 1 and straight cut the ridge portion 12 in the width direction, with starting from an end point P of the oblique cut part. The end point P is positioned in an interface between the blade portion 13 and the ridge portion 12, or positioned with being slightly shifted from the interface. The straight-cut portions S are portions which straight cut the blade portion 13 and the ridge portion 12 in the width direction.

Figure 19:
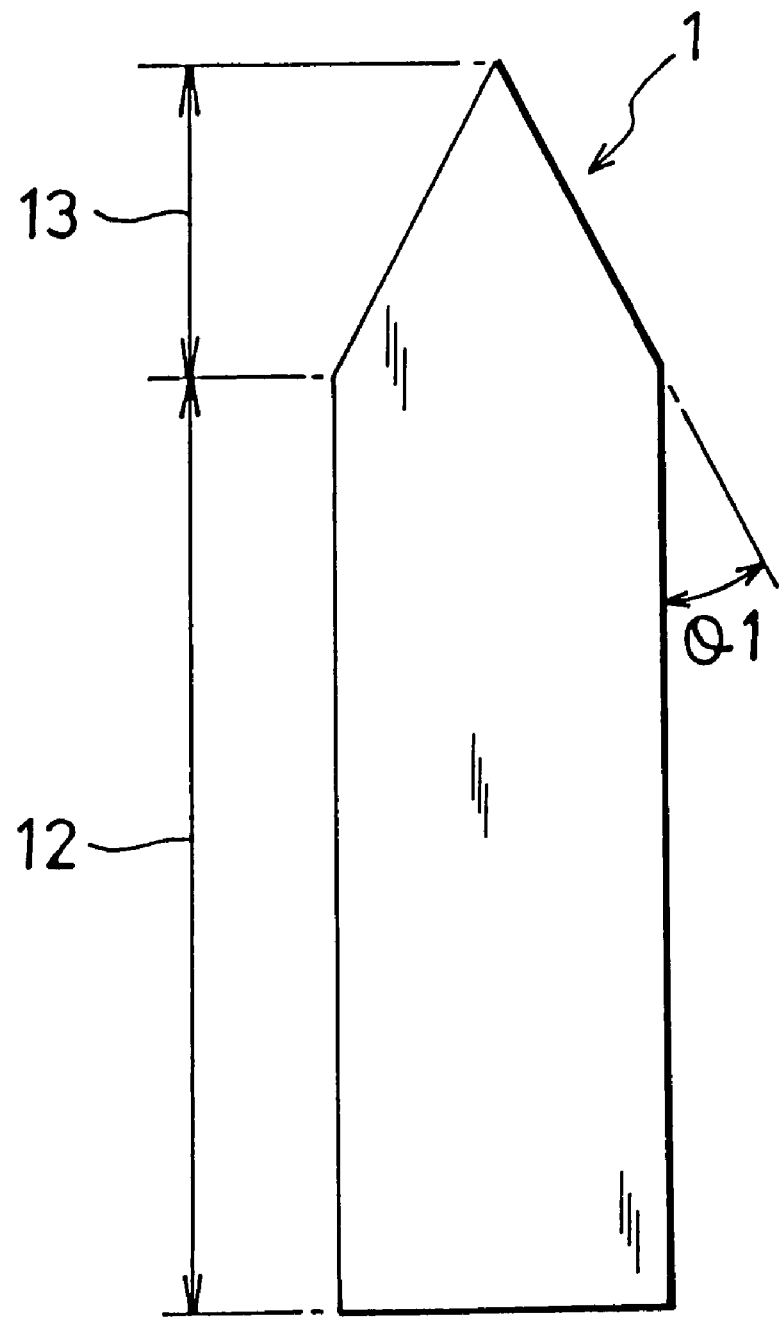
FIG. 19 is an enlarged front view of the band blade.

As shown in FIG. 5, the miter-cutting portions M have tying parts 33 and 43 which are inclined so as to elongate along the surface of the sharp blade portion 13 (see FIG. 19) of the band blade 1 as seen in the front side, and linear parts 34 and 44 which are continuous with the tying parts. In the left and right edged members 3 and 4, the typing parts 33 and 43 and the linear parts 34 and 44 are symmetrically formed. Similarly, the straight-cut portions S have tying parts 35 and 45 which are inclined so as to elongate along the surface of the sharp blade portion 13 of the band blade 1 as seen in the front side, and linear parts 36 and 46 which are continuous with the typing parts. In the left and right edged members 3 and 4, the tying parts 35 and 45 and the linear parts 36 and 46 are symmetrically formed.

During an operation of cutting the band blade 1, the left and right edged members 3 and 4 are closed together with sliding over each other. As shown in FIGS. 3 and 5, when the left and right edged members 3 and 4 are opened, an open space 37 is formed in the miter-cutting portions M and the straight-cut portions S, so that a part of the band blade 1 to be cut can be placed in the open space 37. As shown in FIGS. 4 and 6, in the sliding faces of the left and right edged members 3 and 4, parts corresponding to the tying parts 33 and 43 of the miter-cutting portions M are formed as inclined faces 38 and 48, and the whole faces below the inclined faces 38 and 48 are formed as flat faces 39 and 49.

Figure 7A:
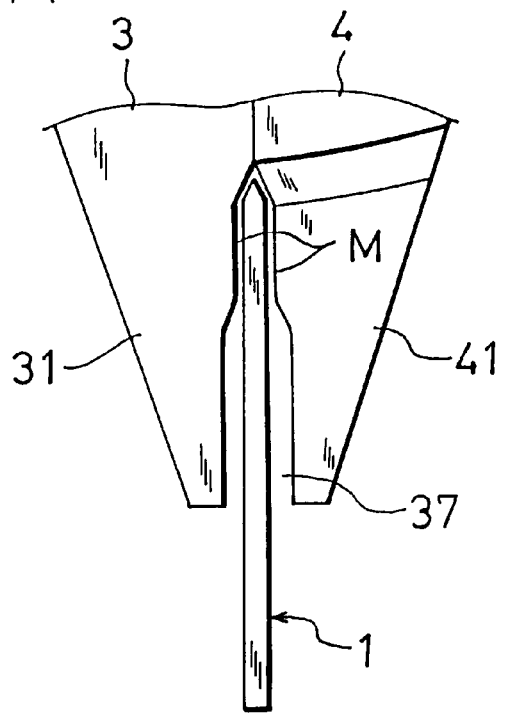
FIG. 7A is a diagram of miter cutting as seen from the front side.
Figure 7B:
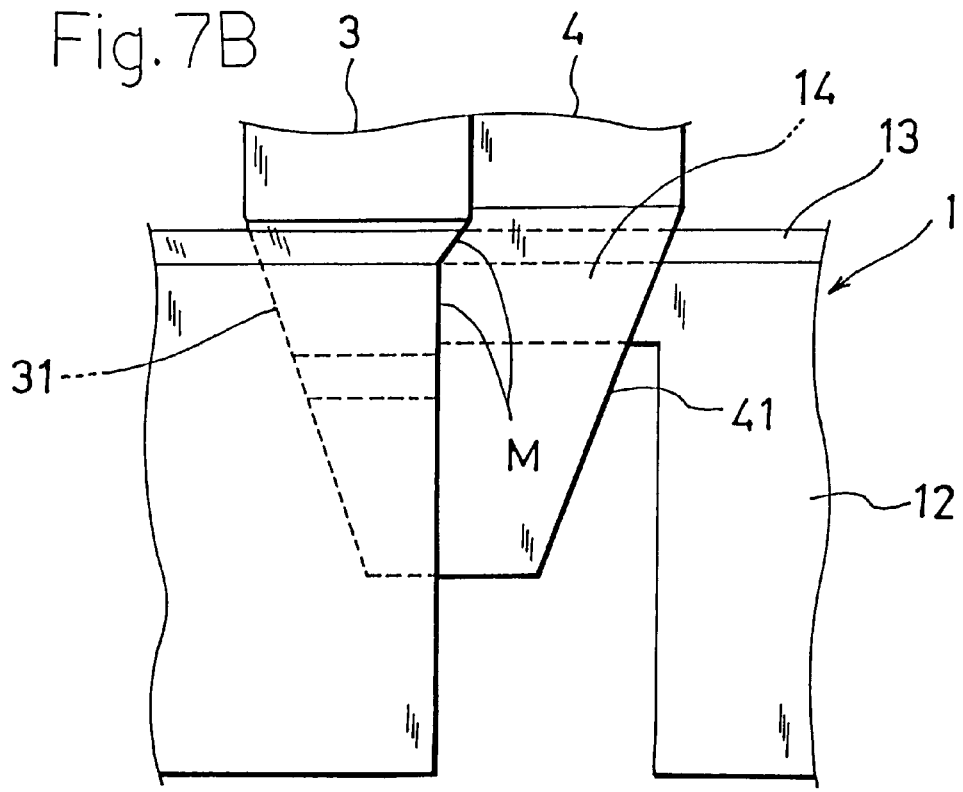
FIG. 7B is a diagram of miter cutting as seen from a lateral side.

The cutting operation by the left and right edged members 3 and 4 of the band-blade cutting tool 2 will be described with reference to FIGS. 7A, 7B, 8A, and 8B. FIGS. 7A and 7B show the case where miter cutting is conducted. In this case, as illustrated, the miter-cutting portions M of the left and right edged members 3 and 4 are opened, and a part of the band blade 1 to be cut (in the illustrated example, the left end of a bridge 14) in which the bridge 14 is previously formed is placed in the open space 37. Thereafter, the left and right edged members 3 and 4 are closed by using the cutting tool driving mechanism 6 (which will be described later). This causes the left and right edged members 3 and 4 to be closed together with sliding over each other, thereby cutting the part to be cut. As a result, the blade portion 13 of the band blade 1 is cut into a shape in which the blade portion is obliquely protruded, or miter cutting is conducted.

FIGS. 8A and 8B show the case where straight cutting is conducted. In this case, as illustrated, the straight-cut portions S of the left and right edged members 3 and 4 are opened, and a part of the band blade 1 to be cut (in the illustrated example, the left end of a bridge 14) in which the bridge 14 is previously formed is placed in the open space 37. Thereafter, the left and right edged members 3 and 4 are closed by using the cutting tool driving mechanism 6 (which will be described later). This causes the left and right edged members 3 and 4 to be closed together with sliding over each other, thereby cutting the part to be cut. As a result, the blade portion 13 and the ridge portion 12 of the band blade 1 are straight cut in the width direction, or straight cutting is conducted.

Figure 11A:
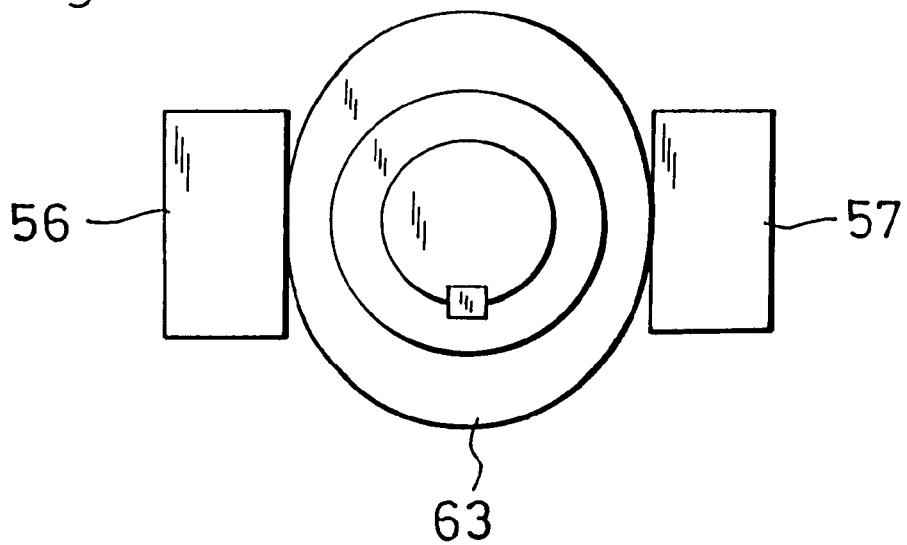
FIG. 11A is a diagram of main portions of a cutting tool driving mechanism.
Figure 11B:
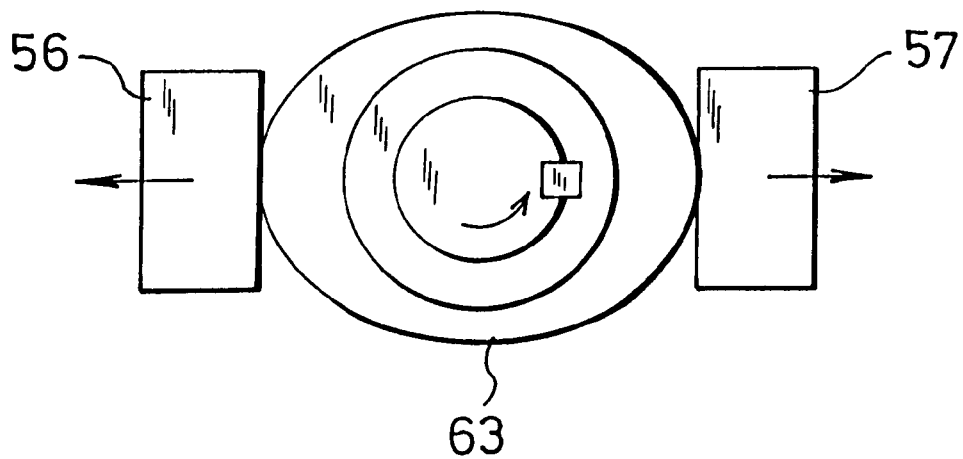
FIG. 11B is a diagram of main portions of the cutting tool driving mechanism.

As shown in FIGS. 9 and 10, arm portions 51 and 52 are coupled to the mounting pieces 32 and 42 of the pair of left and right edged members 3 and 4, respectively. Bearing portions 53 and 54 which are respectively disposed in middle parts of the left and right arm portions 51 and 52 are coupled to each other by a support shaft 55 in a relatively swingable manner. Sliding members 56 and 57 are opposingly disposed on the upper free end portions of the left and right arm portions 51 and 52, so as to be separated from each other by a given distance, respectively. By contrast, although not directly shown, a rotation driving source 61 such as a pulse motor (hereinafter, referred to as "motor") is mounted on a support frame 58 which supports the support shaft 55. A rotating cam 63 is coupled to the rotation shaft of the motor 61 via a reduction mechanism 62. As shown in FIGS. 11A and 11B, in the rotating cam 63, the outer peripheral face serving as a cam face has an elliptic shape. The sliding members 56 and 57 are placed on both the sides of the cam face. The motor 61, the reduction mechanism 62, the rotating cam 63, and the sliding members 56 and 57 constitute the cutting tool driving mechanism 6 which opens and closes the left and right edged members 3 and 4 via the left and right arm portions 51 and 52. When a configuration having a rotating cam and sliding members is employed as the cutting tool driving mechanism 6, the configuration is not restricted to that shown in FIGS. 11A and 11B. For example, a configuration may be employed in which an eccentric cam is key-coupled to the rotation shaft of the motor 61, a ring cam (a bearing may be used) which is concentric with the eccentric cam is fittingly held on the eccentric cam so as to be slidably rotatable, and the sliding members 56 and 57 are disposed on both the sides of the ring cam.

When the minor axis direction of the rotating cam 63 coincides with the arrangement direction of the left and right sliding members 56 and 57 as shown in FIG. 11A, the left and right sliding members 56 and 57 are free so that the left and right edged members 3 and 4 of the band-blade cutting tool 2 are opened as shown in FIG. 9, and hence a band blade can be placed in the open space 37. Therefore, the band blade 1 can be placed in the miter-cutting portions M which have been described with reference to FIGS. 7A and 7B, or in the straight-cut portions S which have been described with reference to FIGS. 8A and 8B. When the major axis direction of the rotating cam 63 is made coincident with the arrangement direction of the left and right sliding members 56 and 57 as shown in FIG. 11B by controlling the rotation of the motor 61, the left and right sliding members 56 and 57 are pressed and opened by the rotating cam 63 as indicated by the arrows in the figure, and hence the left and right edged members 3 and 4 which have been opened are closed together with sliding over each other. As a result, for example, miter cutting which has been described with reference to FIGS. 7A and 7B, or straight cutting which has been described with reference to FIGS. 8A and 8B is conducted on the band blade 1.

Next, working in which the band blade 1 is bent into a predetermined shape by automatically controlling the band-blade working apparatus 10 which has been described with reference to FIG. 1, and that in which the front and rear ends of the band blade 1 are miter-cut will be described.

Figure 12A:
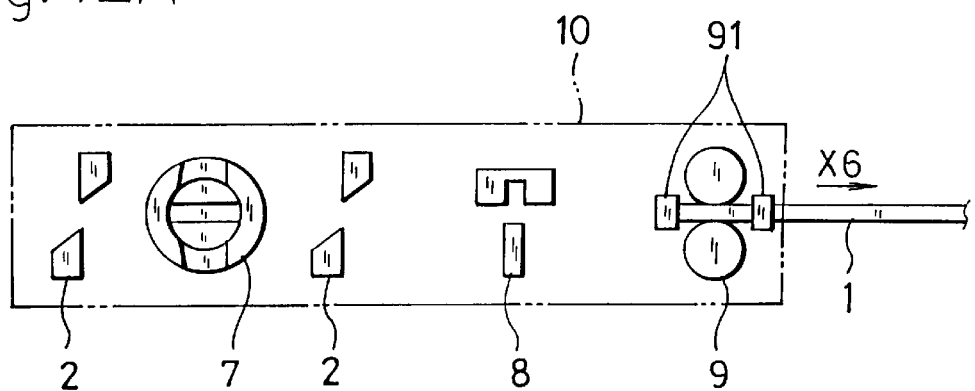
FIG. 12A is a plan view of the configuration of an initial state and showing a procedure of working a band blade.
Figure 12B:
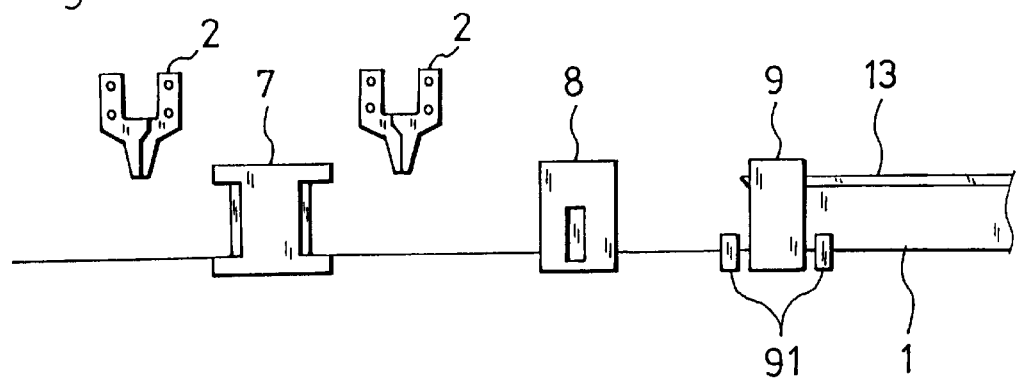
FIG. 12B is a side view of the configuration of the initial state and showing the procedure of working the band blade.

FIGS. 12A and 12B show an initial state. In the initial state, the front end of the band blade 1 is positioned in the reciprocal driving mechanism 9 (initial position). The initial position of the band blade 1 is detected or controlled by a sensor 91. When the band blade 1 is positioned in the initial position, the bridge 14 (not shown) exists in the front end of the band blade 1.

Figure 13A:
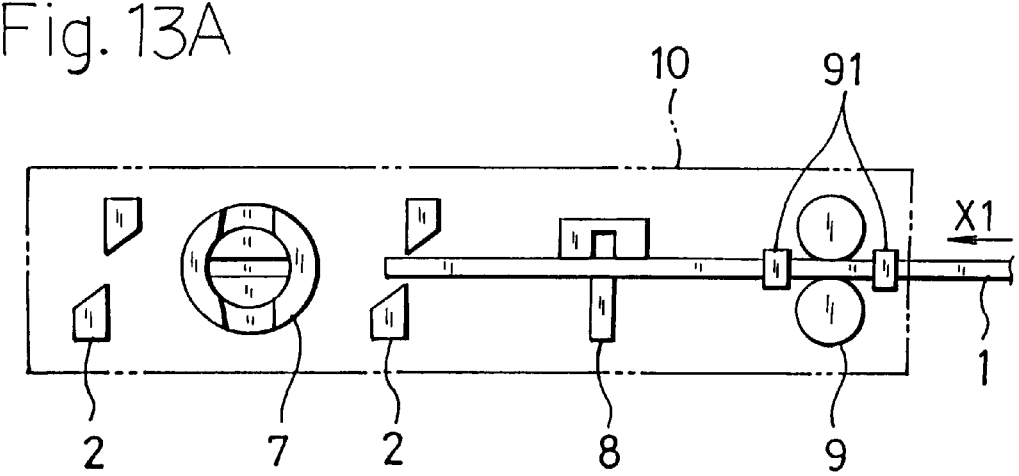
FIG. 13A is a plan view of the configuration of miter cutting and showing the procedure of working the band blade.
Figure 13B:
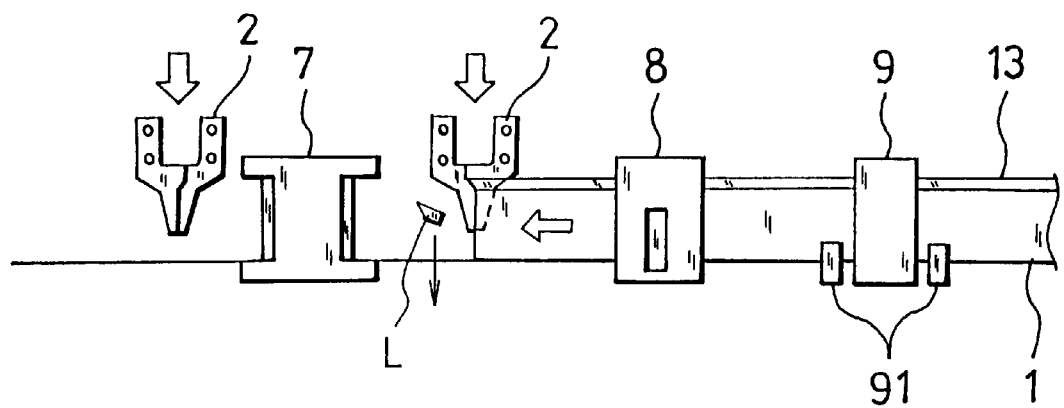
FIG. 13B is a side view of the configuration of miter cutting and showing the procedure of working the band blade.

As indicated by the arrow X1 of FIG. 13A, the band blade 1 is forward fed to the rear band-blade cutting tool 2 by the reciprocal driving mechanism 9. In this position, the bridge 14 in the front end of the band blade 1 is cut away, and the blade portion 13 is miter-cut so as to be forward protruded as shown in FIG. 13B. A produced cut piece L is recovered through the chute 101 (see FIG. 1).

Figure 14A:
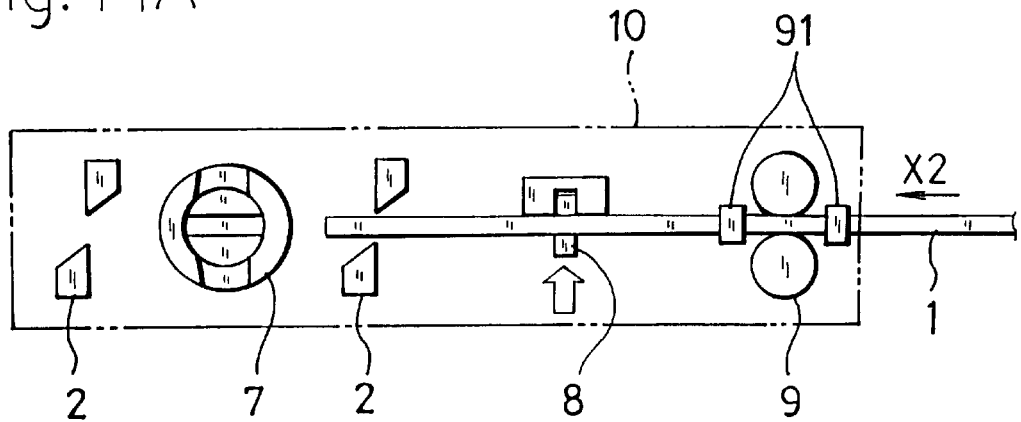
FIG. 14A is a plan view of the configuration of bridge punching and showing the procedure of working the band blade.
Figure 14B:
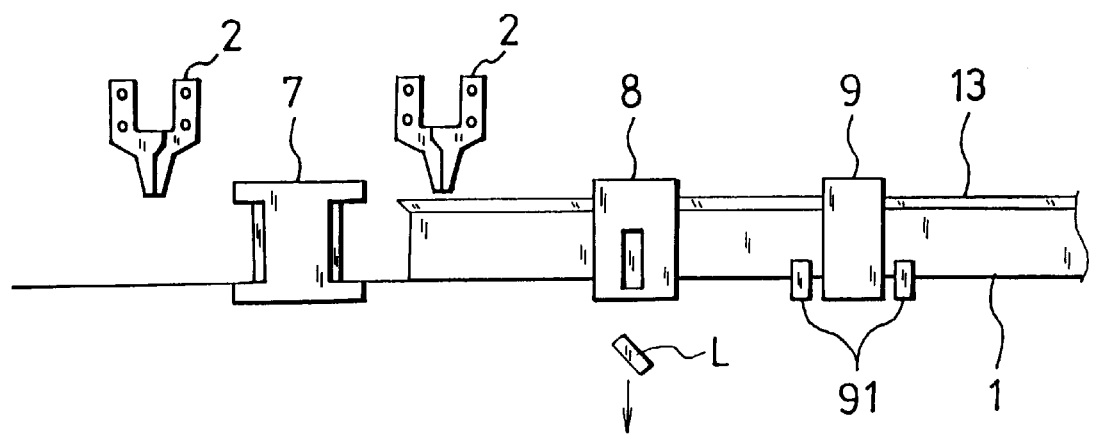
FIG. 14B is a side view of the configuration of bridge punching and showing the procedure of working the band blade.

As indicated by the arrow X2 of FIG. 14A, the band blade 1 is slightly forward fed by the reciprocal driving mechanism 9 so as to pass over the rear band-blade cutting tool 2, and, in this position, the bridge punching mechanism 8 is operated to form the bridge 14 (not shown). As shown in FIG. 14B, a produced cut piece L is recovered through the chute 101 (see FIG. 1).

Figure 15A:
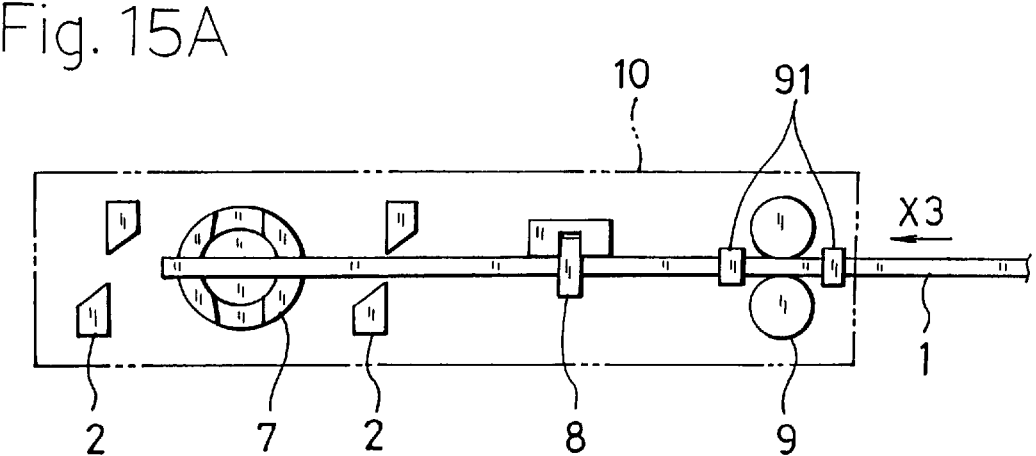
FIG. 15A is a plan view of the configuration of bridge punching and showing the procedure of working the band blade.
Figure 15B:
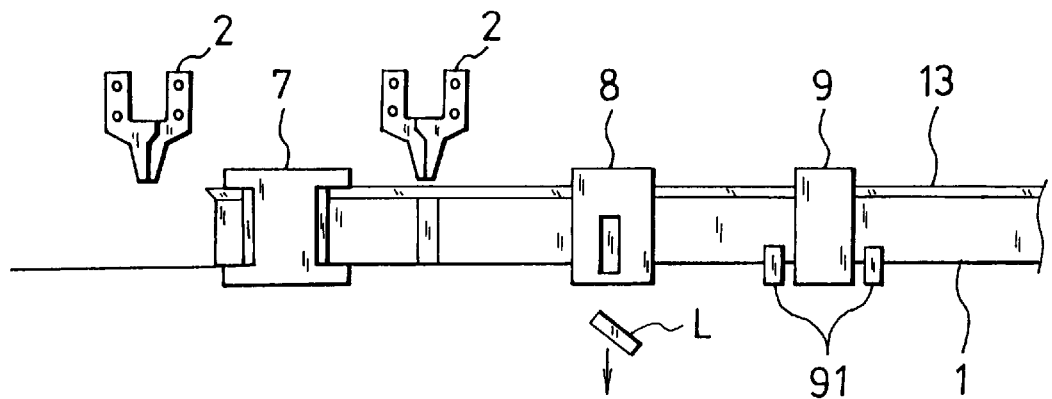
FIG. 15B is a side view of the configuration of bridge punching and showing the procedure of working the band blade.

As indicated by the arrow X3 of FIG. 15A, the band blade 1 is then forward fed to the bending mechanism 7 by the reciprocal driving mechanism 9, and, in this position, the bridge punching mechanism 8 is operated to form the bridge 14 (not shown). As shown in FIG. 15B, a produced cut piece L is recovered through the chute 101 (see FIG. 1).

Figure 16A:
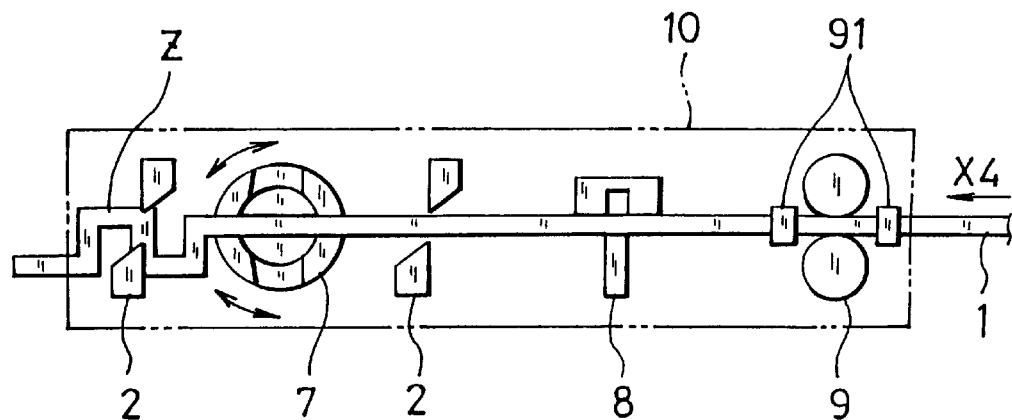
FIG. 16A is a plan view of the configuration of bending and showing the procedure of working the band blade.
Figure 16B:
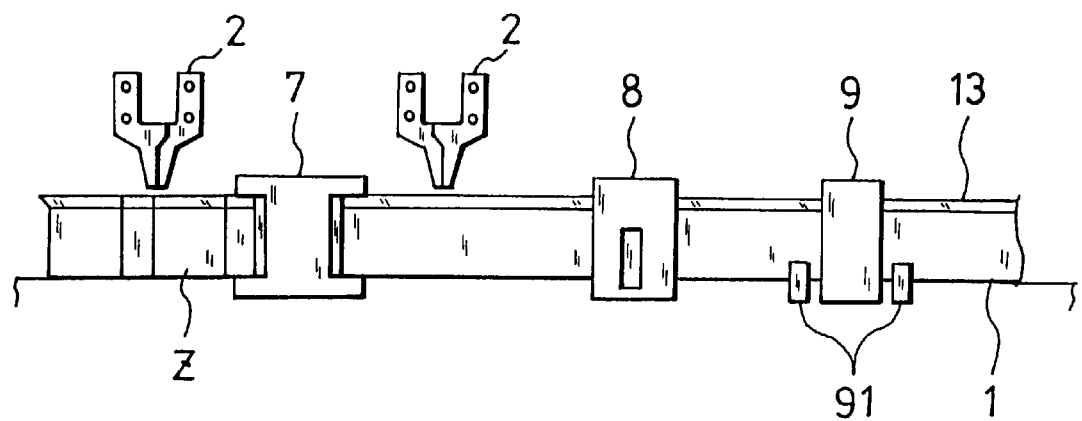
FIG. 16B is a side view of the configuration of bending and showing the procedure of working the band blade.

Next, forward feeding by the reciprocal driving mechanism 9 and indicated by the arrow X4 of FIG. 16A, and bending by the bending mechanism 7 are conducted on the band blade 1. In FIGS. 16A and 16B, the bent region is indicated by a reference character Z.

Figure 17A:
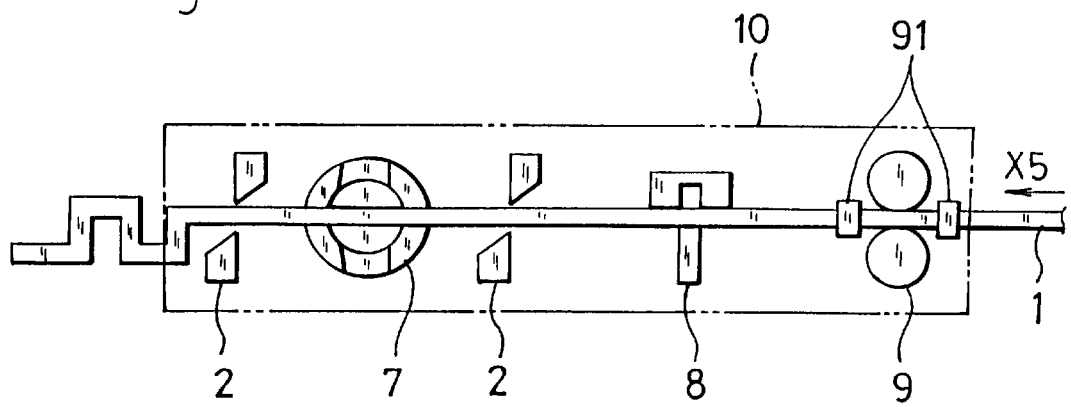
FIG. 17A is a plan view of the configuration of miter cutting and showing the procedure of working the band blade.
Figure 17B:
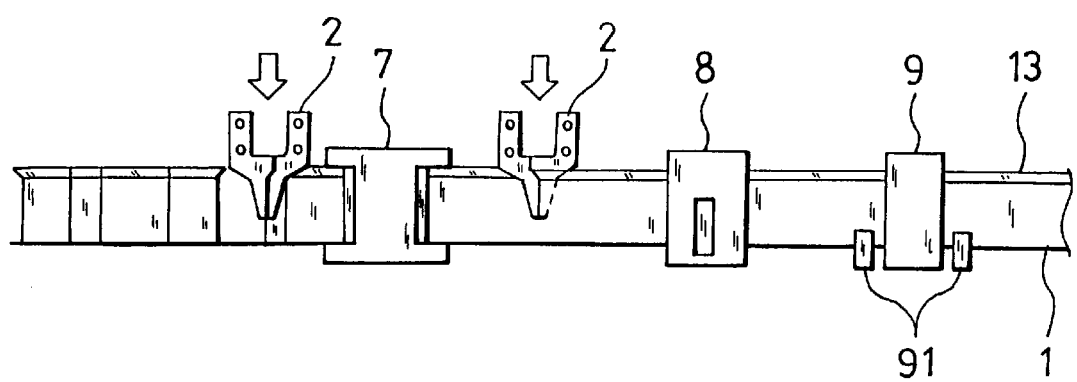
FIG. 17B is a side view of the configuration of miter cutting and showing the procedure of working the band blade.

As indicated by the arrow X5 of FIG. 17A, the band blade 1 is then forward fed by the reciprocal driving mechanism 9, and the rear side of the bent region Z is miter-cut by the front band-blade cutting tool 2 as shown in FIG. 17B.

Thereafter, as indicated by the arrow X6 of FIG. 12A, the band blade 1 is rearward fed to the initial position by the reciprocal driving mechanism 9, so as to be prepared for the next working.

In the working procedure which has been described with reference to FIGS. 12A, 12B to 17A, and 17B, when the band blade 1 is to be cut by the front and rear band-blade cutting tools 2, the produced bridges 14 which are formed in the band blade 1 by the bridge punching mechanism 8 are cut. As shown in FIG. 22C, for example, the bridges 14 have a width which is smaller than the total width of the band blade 1, and therefore can be easily cut.

Figure 22A:
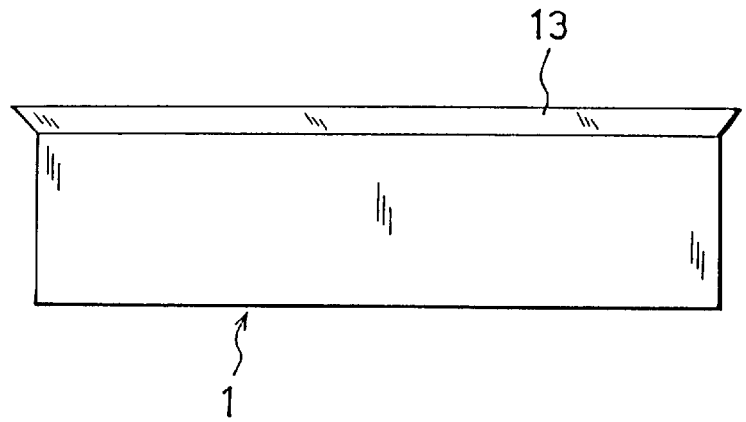
FIG. 22A is a side view of a band blade in which both ends are miter-cut.
Figure 22B:
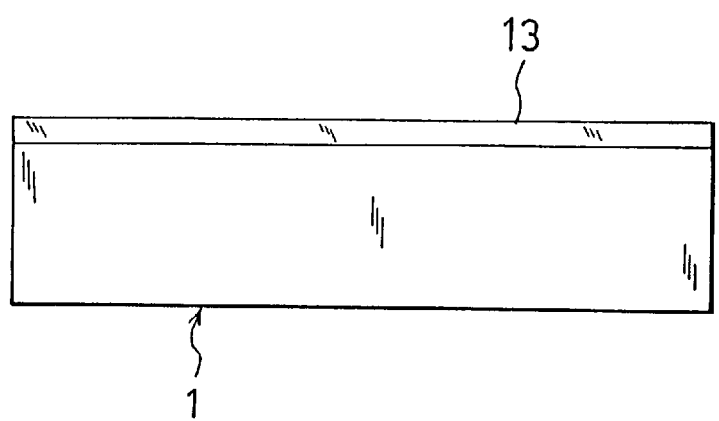
FIG. 22B is a side view of a band blade in which both ends are straight-cut.
Figure 22C:
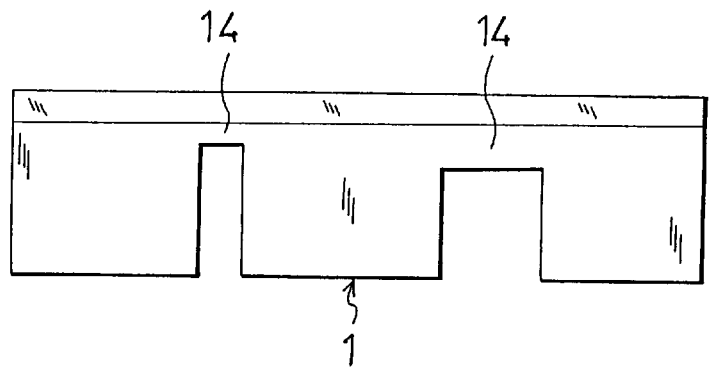
FIG. 22C is a side view of a band blade in which bridges are formed.

In the working which has been described with reference to FIGS. 12A, 12B to 17A, and 17B, both the front and rear ends of the band blade 1 are miter-cut as shown in FIG. 22A. In the front and rear band-blade cutting tools 2, the miter-cutting portions M and the straight-cut portions S can be selectively used. As shown in FIG. 22B, therefore, both the front and rear ends of the band blade 1 can be straight-cut. Furthermore, one of the front and rear ends can be miter-cut, and the other end can be straight-cut.

The entire disclosure of Japanese Patent Application No. 10-154528 filed on Jun. 3, 1998 including specification, claims, drawings and summary are incorporated herein by reference in its entirety.

What is claimed is:

1. A method of working a band blade to be cut after the band blade is bent, comprising the steps of:

bending a band blade into a predetermined shape by using a bending mechanism;

forward feeding the bent band-blade; and cutting away a rear portion of a bent region of the band blade which is forward fed, by using a front band-blade cutting tool which is placed in front of said bending mechanism, wherein said front band-blade cutting tool comprises both a miter-cutting portion which conducts cutting so that the blade portion of the band blade to be cut protrudes rearwardly, and a straight-cutting portion which straight cuts the blade portion of the band blade to be cut, in the width direction, and selectively uses said miter-cutting portion and said straight-cutting portion.

2. The method of working a band blade according to claim 1, wherein the blade portion of the band blade is cut by said front band-blade cutting tool so as to protrude rearwardly.

3. The method of working a band blade according to claim 1, wherein the blade portion of the band blade is straight cut in a width direction by said front band-blade cutting tool.

4. The method of working a band blade according to claim 1, wherein, a step of cutting a front end of the band blade by using a rear band-blade cutting tool which is placed in the rear of said front band-blade cutting tool is conducted in advance of said step of bending the band-blade into a predetermined shape, wherein said rear band-blade cutting tool comprises both a miter-cutting portion which cuts the front end of the band blade so that the blade portion protrudes forwardly, and a straight-cutting portion which straight cuts the front end of the band blade in the width direction of the blade portion, and selectively uses said miter-cutting portion and said straight-cutting portion.

5. The method of working a band blade according to claim 4, wherein the front end of the blade portion is cut by using said rear band-blade cutting tool so that the blade portion protrudes forwardly.

6. The method of working a band blade according to claim 4, wherein the front end of the band blade is straight cut in a width direction of the blade portion by using said rear band-blade cutting tool.

7. The method of working a band blade according to claim 1, wherein a bridge is previously formed by applying punching on a part of the band blade in a place of the band blade which is to be cut by using said front band-blade cutting tool.

8. The method of working a band blade according to claim 4, wherein a bridge is previously formed by applying punching on a part of the band blade in a place of the band blade which is to be cut by using said rear band-blade cutting tool.

9. The method of working a band blade according to claim 4, wherein a bridge is previously formed by applying punching on a part of the band blade in a place of the band blade which is to be cut by using said front band-blade cutting tool or said rear band-blade cutting tool.

10. The method of working a band blade according to claim 4, wherein, after the front end of the band blade is cut by using said rear band-blade cutting tool, the band blade is forward fed, a bridge is formed in the band blade by using a bridge punching mechanism, and the band blade is then forward fed to be bent into a predetermined shape by said bending mechanism.

\* \* \* \* \*